United States Patent [19]

Nasu

[11] Patent Number: 4,957,387
[45] Date of Patent: Sep. 18, 1990

[54] SPLINE JOINT

[75] Inventor: Kenji Nasu, Sanda, Japan

[73] Assignee: K.S. Sanoyas Co. Ltd., Sanda, Japan

[21] Appl. No.: 225,759

[22] Filed: Jul. 29, 1988

[30] Foreign Application Priority Data

Feb. 4, 1988 [JP] Japan .............................. 63-14507[U]

[51] Int. Cl.$^5$ .......................... B25G 3/18; F16B 21/00
[52] U.S. Cl. ................................... 403/322; 403/325;
403/327; 403/359; 403/317
[58] Field of Search .............. 403/322, 324, 325, 326,
403/327, 328, 359, 372, 316, 317, 318

[56] References Cited

U.S. PATENT DOCUMENTS

| | | | |
|---|---|---|---|
| 2,728,895 | 12/1955 | Quackenbush et al. | 403/325 |
| 3,260,541 | 7/1966 | Sadler et al. | 403/325 |
| 3,551,013 | 12/1970 | Trojanowski et al. | 403/317 |
| 4,198,080 | 4/1980 | Carpenter | 403/324 |
| B1-4,198,080 | 5/1984 | Carpenter | 403/325 |
| 4,464,077 | 8/1984 | Herchenbach et al. | 403/325 |
| 4,645,372 | 2/1987 | Suzuki | 403/325 |
| 4,749,301 | 6/1988 | Suzuki | 403/322 |

FOREIGN PATENT DOCUMENTS 3120367  11/1982  Fed. Rep. of Germany .
62-228716 10/1987  Japan .
2099546  12/1984  United Kingdom .

Primary Examiner—Randolph A. Reese
Assistant Examiner—Carol I. Bordas
Attorney, Agent, or Firm—Sandler, Greenblum & Bernstein

[57] ABSTRACT

A spline joint includes an externally splined shaft end and an internally splined hub end engaged therewith. The shaft end has an annular groove around the spline portion wherein a plurality of locking balls may ride. The hub has the same number of holes as there are locking balls, each of which hole is adapted to receive a locking ball. A sliding sheath surrounds the hub. This sliding sheath has an annular projection and an annular groove in axially spaced relation around its internal face. The annular projection presses against the locking balls when the spline joint is in operation. The annular groove embraces a polygonal spring, the spring having the same number of sides as the number of locking balls. The center of each side of the polygonal spring presses against a lock ball from a radially outward position and prevents the lock balls from going out of position when the spline joint is being detached. Thus, one-touch attach/detach operation is possible by moving the sliding sheath axially relative to the hub.

13 Claims, 3 Drawing Sheets

SPLINE JOINT

BACKGROUND OF THE DISCLOSURE

I. Field of the Invention

The present invention generally relates to a spline joint having locking means to prevent relative axial movement of coupled components, a shaft end having an external spline, and a hub having an internal spline. The joint is formed so as to be suitable for heavy duty coupling, e.g., the coupling which occurs between a power take-off shaft and a power transmission shaft having a universal joint at a coupling end. Such a power transmission shaft often serves as a shaft intermediate between two members, and often includes a separate universal joint at one end thereof.

II. Discussion of Prior Art

Spline joints have been known and used for a long period of time; the spline joint is one of the most reliable and common coupling structures used to prevent angular slippage. In order to prevent relative axial movement between a hub and the end of a shaft, a pin, a cotter device, or other locking means have been used. Such structures and devices are generally sufficiently safe for practical usage, but the pair of coupling members must occupy a specified angular position in order to place the locking member in an appropriate position. Accordingly, it takes a relatively long time to effect a coupling operation; and, further, it is often difficult to align the spline pair in an appropriate, correct straight line.

Accordingly, a faster and easier structure which will still result in correct alignment, irrespective of the angular relationship between the pair of connecting members, has been desired.

SUMMARY OF THE INVENTION

Accordingly, a primary object of the present invention is to provide a spline joint coupling a shaft end and a hub quickly and easily in correct alignment, irrespective of the relative angular positions of these members.

Another object of the present invention is to provide a spline joint for coupling a power take-off shaft of a power generator and a power transmission shaft having a universal joint at its coupling end.

Still a further object of the present invention is to provide a spline joint for coupling the power take-off shaft of a power generator and a power transmitting intermediate shaft which has universal joints at both of its ends.

Briefly, the present invention provides a spline joint including a shaft end, a hub, a plurality of locking balls, a sliding sheath, and a polygonal spring. The shaft end has an annular groove around an external splined portion, which annular groove is adapted to hold part of the locking balls in rolling engagement therewith. The hub includes an internal spline which is adapted to engage the external spline of a shaft end, and also includes a plurality of equally angularly disposed holes which extend radially therethrough. Each of the holes is adapted to receive a locking ball from a radially outward position but is also adapted to not permit the locking ball to pass through a radially inward position of the hole. The hub includes a recess along the radially outwardly located periphery of each hole in a generally transverse direction with respect to the axis of the hub, and each of the polygonal springs is a generally rectangular polygonal spring having a number of sides which is equal to the number of locking balls provided. The sliding sheath concentrically covers the hub in an axially sliding engaging fashion. The sliding sheath includes an annular projection and an annular groove which are positioned at axially spaced locations, about the internal surface of the sheath, such that the annular projection will press the locking balls from a radially outward location to lock the spline joint when it is being used. The annular groove is adapted to embrace the polygonal spring in a stationary, i.e., unrotatable, fashion. The sides of the polygonal spring, when those sides get into the recesses of the respective hub holes about the center thereof, serve to push the locking balls elastically and to prevent the locking balls from being separated from the holes when the spline joint is to be detached.

A spline joint according to the present invention includes, therefore, a shaft having an end portion forming external splines, the externally splined end portion further forming an annular groove; a plurality of locking balls in rolling engagement with the annular groove; a hub having an internal portion forming splines adapted to engage the external splines of the shaft, the hub further having a plurality of holes extending radially therethrough, the number of the holes being equal to the number of locking balls, each of the holes adapted to partially retain a locking ball which is positioned therein from a radially outward location; a sliding sheath having an internal face encircling the hub, the sheath having an annular projection and an annular groove in axially spaced relation around its internal face, the annular projection operable to urge the locking balls in the direction of the annular groove when the annular projection portion is positioned over said locking balls.

An embodiment of the present invention includes everything in the immediately preceding paragraph and also includes a polygonal spring, the number of sides thereof equal to the number of locking balls. In such an embodiment, the annular groove and the sliding sheath is adapted to embrace the polygonal spring so that the center of each side of the spring engages a locking ball when the annular groove in the sliding sheath is slid into alignment with the holes through the hub.

Yet another embodiment of the present invention includes means for biasing the sliding sheath so that the projected portion thereof engages the locking balls during normal joint operation. Such biasing means could comprise a coil spring and, if so, the biasing means could also include means for holding the coil spring in position. This holding means could include an upright annular shoulder mounted on the hub.

Cover means covering the hub and the coil spring could be present in an embodiment of the present invention.

Various embodiments of the present invention are directed to means for coupling a shaft end having external splines thereon and an annular groove therearound to a hub having internal splines therein, which internal splines are adapted to engage the external splines on the shaft end, the hub further having a plurality of holes extending radially therethrough. Such means include a plurality of locking balls, each of the locking balls being positionable in one of the plurality of holes from a radially outward location, and means for selectively urging a portion of the plurality of locking balls into the annular groove around the shaft end. Such means may also include a sliding sheath encircling the hub, which sliding sheath could include a projecting portion which could be positioned over the locking balls.

The present invention may also include a polygonal spring, in which cases the sliding sheath would include an annular groove adapted to embrace the polygonal spring.

In the present invention, the center of each side of the polygonal spring may be positioned so as to engage a locking ball.

The present invention may include means for biasing the sliding sheath so that in normal attachment operation a projecting portion thereof is positioned over said locking balls. These biasing means may comprise a spring. Such a spring may have two ends and be positioned so as to abut the hub at one end thereof and the sliding sheath at the other end thereof.

The present invention may include abutment means mounted on the hub, which abutment means may engage the sliding sheath, and wherein the spring is held compressed in its least compressed position by engagement of the sliding sheath and the abutment means.

The present invention may include protective covering means for covering the hub and the spring.

Locking means according to the present invention for a spline joint includes a generally cylindrical sliding member having an internal surface facing the joint, a portion of the internal surface forming an annular groove and another portion of the internal surface forming an inwardly projection protrusion.

The locking means according to the present invention may also include means responsive to the inwardly projected protrusion, for locking the spline joint.

Locking means according to the present invention may also include means for spring loading the sliding member and abutment means for restraining movement of the sliding member so that, in normal operation, the inwardly projecting protrusion engages the means for locking the spline joint.

Means for spring loading the sliding member may comprise a spring. The spring may engage the sliding member and the spring may be a polygonal spring.

The locking means according to the present invention may include a cover disposed over the sliding sheath and the spring.

According to the present invention, a spline joint comprising a shaft end, a hub, a plurality of locking balls having surfaces, a sliding sheath and a polygonal spring is characterized in that the shaft has an external spline and an annular groove around the splined portion thereof, which annular groove is adapted to be in contact with part of the surface of each of the locking balls and in rolling engagement therewith; the hub has an internal spline adapted to engage the external spline of the shaft, the hub further has a plurality of equiangularly disposed holes extending radially therethrough, each of which holes receives a locking ball from a radially outward location but does not permit a locking ball to go through radially inward, the hub still further has an axis and a recess at the radially outward periphery of each hole in crosswise direction to the axis thereof; the polygonal spring is of a regular polygonal type having the same number of sides as there are number of locking balls; the sliding sheath is positioned so as to concentrically overcover the hub in axially sliding engagement; the sliding sheath has an annular projection and an angular groove in axially spaced relation to each other on the internal surface thereof, such that the projection presses the locking balls from radially outward and locks the spline joint when in locked operation, and the annular groove embraces the polygonal spring in a manner so that it cannot rotate but so that the sides thereof, on getting in the recesses of the respective holes of said hub about the center thereof, push the locking balls elastically and prevent them from going out of their respective holes when the spline joint is being detached.

In various embodiments of the present invention the said polygonal spring may be a triangular spring.

In embodiments of the present invention the hub may have abutment means at a foot thereof, and a coil spring is provided therearound between the abutment means and the opposing face of the sliding sheath, which invariably exerts pressure against the sliding sheath.

In embodiments of the present invention the spline joint may be further overcovered radially outwardly with a covering which protects the sliding sheath and the coil spring from foreign materials.

BRIEF DESCRIPTION OF THE DRAWINGS

One embodiment of the present invention will now be described with respect to the accompanying drawings, in which like reference numerals represent similar parts throughout the several views, and wherein.

DETAILED DESCRIPTION OF THE DRAWINGS

Figure 1:
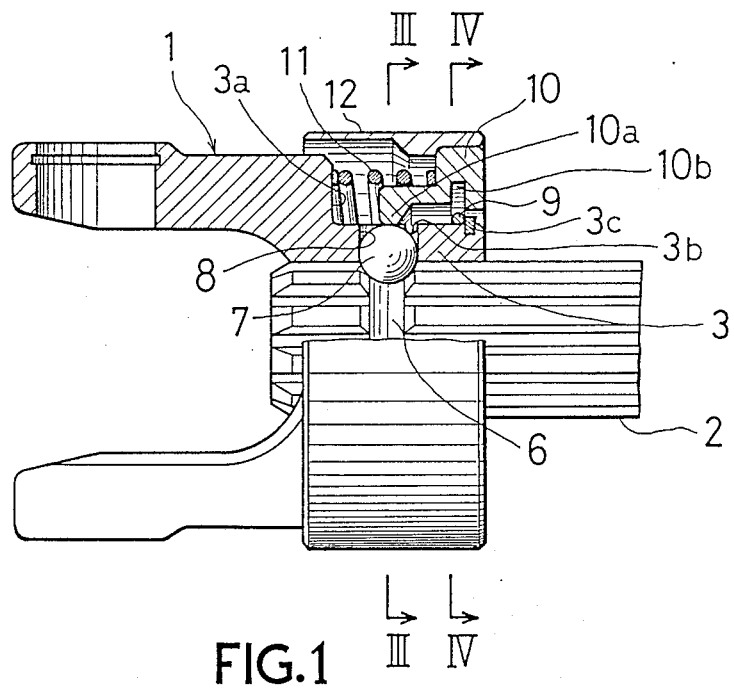
FIG. 1 is a side elevational view, partly cross-sectional, of a spline joint formed in accordance with the present invention in its axially locked position.
Figure 2:
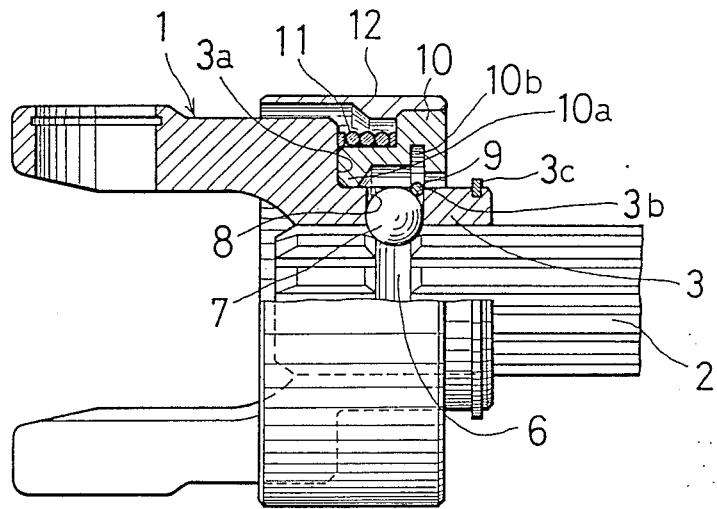
FIG. 2 is a similar elevational view of the same side, but is different from that of FIG. 1 insofar as the spline joint is shown as being in a position in which it can be separated or detached.

Referring more specifically to the drawings, and initially to FIGS. 1 and 2, a shaft having an end 2 is illustrated with an external spline thereon. The external spline is positioned or plugged into a hub 3 having an internal spline such that relative angular displacement between the two members is not possible.

The splined portion of the shaft end 2 includes an annular groove 6 thereon. The annular groove has side walls and a bottom portion which are suitably rounded or arcuate such that they will sit well with the locking balls 7 which are described hereinafter.

Figure 3:
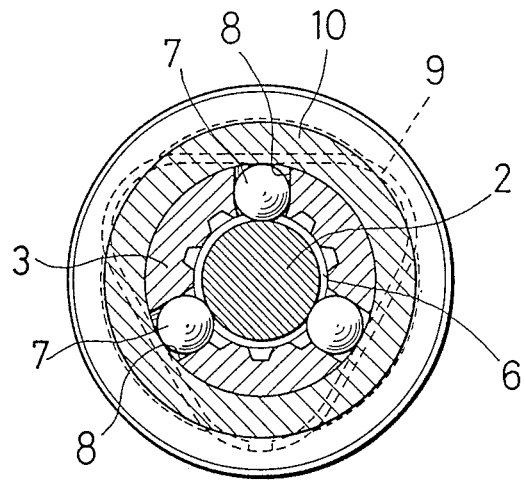
FIG. 3 is a cross-sectional view taken along line III—III of FIG. 1, in the direction of the arrows shown therein, in which the sliding sheath, a coil spring and the covering are all broken away to more clearly illustrate the present invention.
Figure 4:
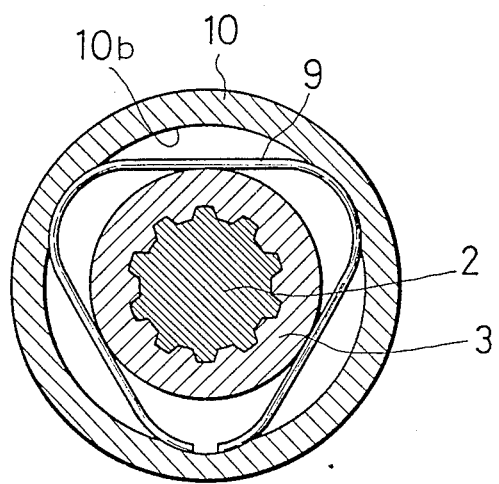
FIG. 4 is a cross-sectional view taken along lines IV—IV of FIG. 1, again in the direction of the arrows shown with the sliding sheath and the covering again broken away to facilitate a clear understanding of these structures.
Figure 8:
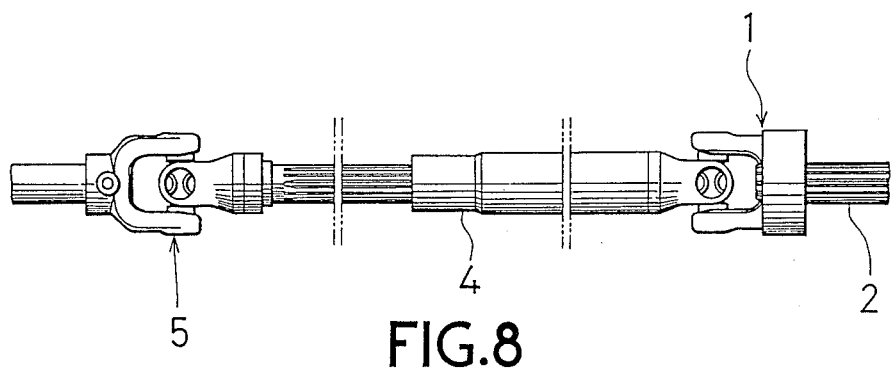
FIG. 8 is an example of the present invention in which the spline joint is used as a means for coupling a power take-off shaft and an intermediate shaft having universal joints at each end of the shaft.

Hub 3 usually forms part of a coupling means, such as a universal joint 1 as illustrated in FIGS. 1, 2 and 8. This hub is formed so that it is substantially narrowed and elongated in the axial direction so as to form a generally upright and annular shoulder 3a along a portion, e.g., a foot, of the member. Shoulder 3a serves as an abutment for coil spring 11, described further hereinafter. An alternate construction would be to provide an annular ledge about the exterior surface of hub 3 for maintaining the hub so as to be a sufficient thickness. As illustrated in FIG. 3, hub 3 has a plurality, e.g., three as illustrated in the drawings, equiangularly disposed holes 8 extending radially through the hub. Each of the holes is adapted to retain a locking ball 7 which is positioned therein from a radially outward location. The number of holes is preferably the same as the number of locking balls which are provided. Each locking ball 7 cannot completely extend through a respective hole 8 inwardly, although approximately half of the ball can extend through the inner aperture. Two representative alternate constructions of the hole are illustrated in FIGS. 5 and 6, with the hole of FIG. 5 having a generally frustoconical configuration, and with the hole in FIG. 6 being illustrated as having a generally cylindrical configuration with an inwardly projected innermost end 8a which narrows towards the radially inner portion of the hole.

Figure 5:
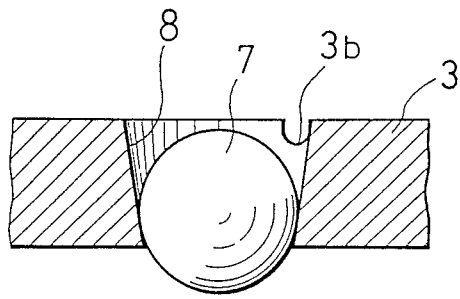
FIG. 5 is a sectional view of one exemplary position in which each of the locking balls is held in a respective hole of the hub which is illustrated in FIGS. 1 and 2.
Figure 6:
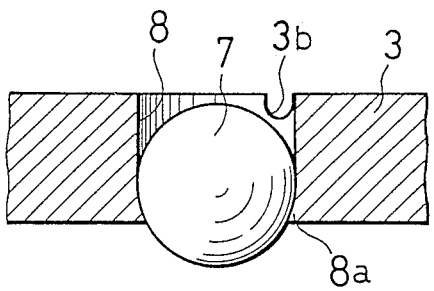
FIG. 6 is a sectional view of another exemplary case in which each of the locking balls is held within each of the hubs illustrated in FIGS. 1 and 2.

As illustrated in FIGS. 1, 2, and particularly in FIGS. 5 and 6, a recess or notch 3b is provided at the periphery of the radially outward opening of each hole 8, in a direction which is substantially transverse to the axis of hub 3. Recess 3b functions to prevent the locking balls 7 from passing outwardly from each hole 8 in cooperation with a polygonal spring 9, e.g., which can be a triangular spring as shown, and which is hereinafter described in greater detail.

Figure 7:
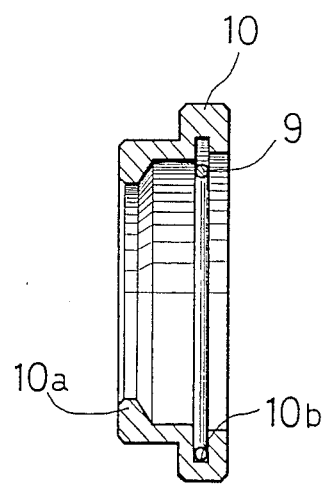
FIG. 7 is a sectional elevational view of the slidable sheath illustrated in FIGS. 1 and 2, with the triangular spring being embraced and retained within the angular groove of the sheath.

A sliding sheath 10 covers hub 3 in a generally axially slidable engaging fashion. Sliding sheath 10 is prevented from moving around hub 3 by the limiting action of an axially extending projection/groove mating device 3c, as illustrated best in FIGS. 1 and 2. As shown in FIG. 7, sliding sheath 10 includes an annular projecting portion 10a and an annular groove 10b along the internal surface thereof. Annular projection 10a functions to press the locking balls 7 within holes 8 toward the annular groove 6 of hub 3, and to inhibit movement of locking balls 7 such that shaft end 2 and hub 3 will be securely, e.g., undetachably, connected. On the other hand, annular groove 10b functions to hold the polygonal spring 9, e.g., the triangular spring which is shown, in a stationary, unrotatable fashion, such that the center of each side of the spring can serve to elastically push the external face of hub 3 during sliding motion. Triangular or other polygonal spring 9 has an equilateral configuration, i.e., all its sides are substantially equal in length. Spring 9 thus functions, when it is positioned within recess 3b of hub 3 during sliding movement along the face of the recess, to elastically press locking balls 7 so as to avoid radially outward movement of the balls from holes 8.

A coil spring 11 is positioned around hub 3 between annular shoulder 3a and the end face of the sliding sheath 10 which is positioned oppositely thereto. The coil spring is located in abutting engagement with the sheath. Coil spring 11 is a compression spring and serves to invariably push sliding sheath 10 to maintain the sliding sheath and the hub spaced from each other. At the farthest extended position defined by abutment means 3c of hub 3, annular projection 10a is arranged so that it rests on locking balls 7 to maintain them in position. Such positioning of the slidable sheath 10 represents a normal operating condition in which the locking balls can never be moved outwardly from the holes, and the locking relationship between shaft end 2 and hub 3 will be maintained.

Coil spring 11 can contract to its other extreme position, in which triangular spring 9 engages the recess 3b and securely positions locking balls 7 in holes 8 in an elastic fashion. In this position, locking balls 7 can move over a relatively small distance radially outwardly, but never move outwardly from holes 8.

As illustrated in FIGS. 1 and 2, covering 12 covers both the sliding sheath and the coil spring 11 therein. Such covering is particularly necessary for dusty and muddy environments which often occur in agricultural and civil engineering applications.

As illustrated in FIG. 8, the spline joint of the present invention can be conveniently used as means for coupling a power take-off shaft 2 and an intermediate shaft 4 having a universal joint 5 at each of its ends. In FIG. 8, reference Numeral 1 illustrates the spline joint of the present invention.

As described above, the spline joint of the present invention can be detached by moving sliding sheath 10 leftwardly (as viewed in FIGS. 1 and 2) against compression spring 11 and by drawing the shaft end 2 outwardly from hub 3; and the spline joint can be attached by moving sliding sheath 10 as indicated above and by inserting the shaft end 2 into hub 3. Sliding sheath 10 moves rightwardly under the action of coil spring 11, and coupling is then completed. Such coupling procedure is effectively a "one-touch" coupling operation.

As a wide variety of different embodiments of the invention can be formed without departing from the spirit of the scope thereof, it should be understood that the invention is not limited to the specific embodiment disclosed herein, but covers all embodiments which are within the scope of the appended claims.

What is claimed is:

1. A spline joint comprising:
    a shaft having an end portion having external splines, said end portion further forming a first annular groove;
    a plurality of locking balls in rolling engagement with said first annular groove;
    a hub having an internal portion including splines which are adapted to engage the external splines of said shaft, said hub further having a plurality of holes extending radially therethrough, the number of said holes being equal to the number of locking balls, each of said holes adapted to partially retain a locking ball which is positioned therein from a radially outward location;
    a sliding sheath having an internal face encircling said hub, said sheath having an annular projection and a second annular groove in axially spaced relation around its locking balls in the direction of said first annular groove when said annular projection is positioned over said locking balls; and
    a polygonal spring, the number of sides thereof being equal to the number of locking balls;
    means for biasing said sliding sheath so that the annular projection engages the locking balls during normal joint operation where said biasing means comprises a coil spring;

wherein said second groove and said sliding sheath are adapted to embrace said polygonal spring so that the center of each side of said spring engages a locking ball when the second annular groove in said sliding sheath is slid into alignment with said holes through said hub.

2. The spline joint of claim 1 wherein said biasing means further comprises means for holding said coil spring in position.

3. The spline joint of claim 2 wherein said means for holding further comprises an upright annular shoulder mounted on said hub.

4. The spline joint of claim 2 further comprising means for covering said hub and said coil spring.

5. A coupling assembly for coupling a shaft end having external splines thereon and a first annular groove therearound to a hub having internal splines therein, which internal splines are adapted to engage the external splines on said shaft end, said hub further having a plurality of holes extending radially therethrough, said coupling assembly comprising:

a plurality of locking balls, each of said locking balls being positionable in one of said plurality of holes from a radially outward location; and a polygonal spring for urging a portion of each of said plurality of locking balls into said first annular groove around said shaft end, a sliding sheath encircling said hub wherein said sliding sheath further comprises a projecting portion which can be positioned over said locking balls; and means for biasing said sliding sheath so that in normal attachment operation said projecting portion is positioned over said locking balls and wherein said biasing means comprises a coil spring.

6. The assembly of claim 5, wherein said sliding sheath further comprises a second annular groove adapted to embrace said polygonal spring.

7. The assembly of claim 6 wherein the center of each side of said polygonal spring is adapted to be positioned so as to engage a locking ball.

8. The means of claim 5 wherein said spring has two ends, one end of which abuts said hub and the other end of which abuts said sliding sheath.

9. The means of claim 8 further comprising abutment means mounted on said hub, said abutment means being adapted to engage said sliding sheath such that said spring is held compressed in its least compressed position by engagement of said sliding sheath and said abutment means.

10. The means of claim 9 further comprising means for protectively covering said hub and said spring.

11. A spline joint comprising a shaft end, a hub, a plurality of locking balls having surfaces, a sliding sheath and a polygonal spring, wherein said shaft has an external spline and a first annular groove around a splined portion of said external spline, said first annular groove being adapted to be in contact with part of the surface of each of said locking balls and in rolling engagement therewith, wherein said hub has an internal spline adapted to engage the external spline of said shaft, said hub further having a plurality of equiangularly disposed holes extending radially therethrough, each of which holes receives a locking ball from a radially outward location but does not permit a locking ball to go through radially inward, said hub still further has an axis and a recess at the radially outward periphery of each hole in crosswise direction to the axis thereof;

wherein said polygonal spring is of a regular polygonal type having the same number of sides as there are number of rocking balls;

wherein said sliding sheath is positioned so as to concentrically overcover said hub in axially sliding engagement; and wherein said sliding sheath has an annular projection and a second angular groove in axially spaced relation to each other on the internal surface thereof, such that the projection presses said locking balls from radially outward and locks the spline joint when in locked operation, and the second annular groove embraces said polygonal spring in a manner so that it cannot rotate but so that the sides of the polygonal spring on getting in the recess of the respective holes of said hub, push said locking balls elastically and prevent them from going out of their respective holes when the spline joint is being detached wherein said hub has abutment means at a foot thereof, and a coil spring is provided therearound between said abutment means and the opposing face of said sliding sheath, which invariably exerts pressure against said sliding sheath.

12. A spline joint as recited in claim 11, wherein said polygonal spring is a triangular spring.

13. A spline joint as recited in claim 11, wherein the spline joint is further covered radially outwardly with a covering which protects said sliding sheath and said coil spring from foreign materials.

* * * * *

UNITED STATES PATENT AND TRADEMARK OFFICE
CERTIFICATE OF CORRECTION

PATENT NO. : 4,957,387

DATED : September 18, 1990

INVENTOR(S) : K. NASU

It is certified that error appears in the above-identified patent and that said Letters Patent is hereby corrected as shown below:

On the front page, item 75, insert ---City--- after "Sanda".
    On the front page, item 75, insert ---City--- after "Sanda".
    In column 8, line 24,(claim 11, line 29), change "rocking" to ---locking---.

Signed and Sealed this

Ninth Day of February, 1993

Attest:

STEPHEN G. KUNIN

Attesting Officer

Acting Commissioner of Patents and Trademarks